United States Patent [19]
Manabe et al.

[11] 3,981,077
[45] Sept. 21, 1976

[54] ELECTRICAL GARDEN SHEARS

[75] Inventors: Keiji Manabe, Neyagawa; Yoshio Ishii, Osaka, both of Japan

[73] Assignee: Matsushita Electric Industrial Co., Ltd., Osaka, Japan

[22] Filed: May 27, 1975

[21] Appl. No.: 580,795

[30] Foreign Application Priority Data
May 31, 1974 Japan.............................. 49-62362
July 18, 1974 Japan.............................. 49-82785

[52] U.S. Cl. .................................. 30/233; 56/17.4
[51] Int. Cl.² ........................................ B26B 19/38
[58] Field of Search ............ 30/132, 194, 200, 201, 30/286, 233; 56/17.4, 255

[56] References Cited
UNITED STATES PATENTS

| | | | |
|---|---|---|---|
| 1,404,603 | 1/1922 | Gray | 30/132 |
| 2,617,189 | 11/1952 | Brown | 30/233 X |
| 2,653,381 | 9/1953 | Rooke | 30/233 X |
| 3,577,714 | 5/1971 | Dahl | 56/255 |
| 3,889,373 | 6/1975 | Achenbach | 30/233 |

FOREIGN PATENTS OR APPLICATIONS

| | | | |
|---|---|---|---|
| 618,339 | 2/1949 | United Kingdom | 30/132 |

*Primary Examiner*—Al Lawrence Smith
*Assistant Examiner*—J. C. Peters
*Attorney, Agent, or Firm*—Wenderoth, Lind & Ponack

[57] ABSTRACT

Electrical garden shears having a rotatory guard provided approximately over cutter blade portions of the shears. The guard prevents fingers or an electric power lead from coming into contact with cutter blades, but rotates to permit cut vegetation to be cleared from the shears.

10 Claims, 7 Drawing Figures

ELECTRICAL GARDEN SHEARS

The present invention relates to electrical garden shears for trimming lawns, shrubs, or similar vegetation. More particularly the invention relates to multi-bladed electrical garden shears of a hair-clipper type having an improved construction ensuring prevention of accidents.

It is known conventionally to provide electrically driven garden shears for trimming lawns, for example, power being supplied to the shears via a lead connecting thereto and connectable to a normal power outlet. Although efficient, such shears have the disadvantage that since the shears are operated continuously once action thereof is started, there is a risk of the power lead or a finger of a person operating the shears being caught or cut by the shear. This is a particular risk when the shears are employed by amateur rather than professional gardeners. To overcome this disadvantage it has been known to provide shears having cutter blades which are sufficiently close-pitched for it to be impossible for the power lead or finger of a person to come therebetween. However, while this resolves problems of safety, there is the problem that the shears have reduced cutting efficiency and are less versatile with respect to cutting different types of vegetation.

It is accordingly an object of the invention to provide electrical garden shears with improved safety characteristics.

It is another object of the invention to provide electrical garden shears which are safe to use but have good cutting efficiency and versatility in cutting various types of vegetation.

In accomplishing these and other objects there are provided, according to the present invention, electrical garden shears which comprise a stationary guard, which covers the main, rear portion of the cutter portion of the shears and is close enough to thereto to prevent entry of a finger or power lead between this part of the cutter portion and the stationary guard and which also serves to guide cut grass or other trimmed plants to opposite sides of the shears; and a rotary guard which is supported by forward extensions of the stationary guard, comprises a rotatably mounted shaft and radially extending paddle blades, and is disposed along a line which is parallel to, higher than and slightly forward of the cutter blades of the shears. Whatever position the rotary guard is rotated to, the paddle blades thereof prevent entry of a finger or power lead between the rotary guard and the cutter blades or the stationary guard. During cutting of grass for example, as the are advanced, the grass to be cut pushes the successive paddle blades, thereby causing rotation of the rotary guard. The paddles in their turn push sheared grass onto the stationary guard which guides the grass to opposite sides of the shears. Thus according to the invention, cutting is carried out efficiently but without any danger of damage to a finger or power lead, and the shears may employ cutting blades of any size or pitch.

In another embodiment of the invention, the rotary guard is a rotatable shaft and polygonal discs are disposed at right-angles to the rotational axis of the shaft and at generally equal intervals along the shaft. These discs serve the same function as the paddle blades in the first embodiment.

A better understanding of the present invention may be had from the following full description of several embodiments thereof when read with reference to the attached drawings, in which like numbers refer to like parts; and FIG. 1 is a perspective view showing the general external features of the electrical garden shears according to a first embodiment of the invention;

Figure 1:
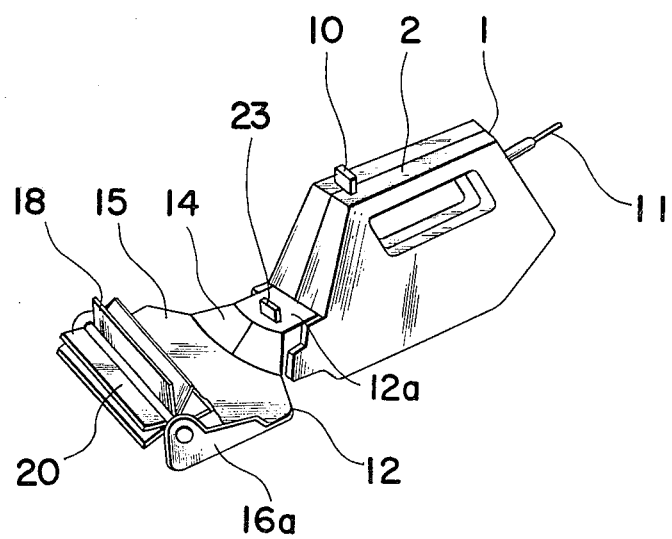
Figure 2:
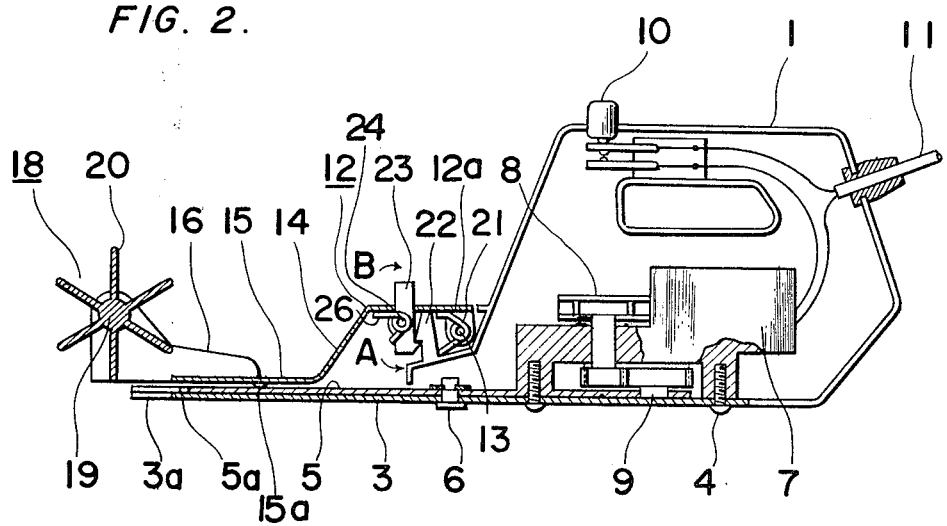
FIG. 2 is a front to rear cross-sectional view of the shears of FIG. 1.

Referring first to FIGS. 1 and 2, there is shown a shears assembly comprising a main body 1 having a handle portion 2. A horizontal, fixed cutter portion 3 extends forwardly from and is affixed by one or more screws 4 to the bottom portion of the main body 1. The front edge portion of the fixed cutter portion 3 defines a plurality of forwardly extending, generally dentiform, cutter blades 3a. A movable cutter portion 5, whose front edge portion defines a plurality of cutter blades 5a having the same general dimensions as the blades 3a, is mounted flat with respect to, and on the upper side of, the fixed cutter portion 3. The movable cutter portion 5 may be moved reciprocally forwards and rearwards, whereby the blades 5a in cooperation with the blades 3a may perform a cutting action in a conventionally known manner, the movable cutter portion 5 being guided in this reciprocal motion by one or more pins 6 fixed to a rear part of the fixed cutter portion 3, and passing through a slot or slots formed in the movable cutter portion 5.

The main body 1 houses a motor 7, which, acting through a reduction gear 8, may drive an excentric cam 9, which is connected to and may cause reciprocal motion of the movable cutter portion 5 in a known manner. Power for the actuation circuit of the motor 7 may be supplied from an external source via a lead 11 which passes through a rear wall portion of the main body 1. The actuation circuit of the motor 7 is closeable upon depression of an externally actuable switch 10 provided for example on the forward end of the handle portion 2. From the point of view of safety, there is preferably provided a lock means not shown, which must be unlocked to permit depression of the switch 10.

Still referring to FIGS. 1 and 2 there is provided a forwardly extending stationary guard 12 whose rear end portion is mounted on the lower front wall portion of the main body 1, and whose front end portion is generally in line with the rear ends of the blades 3a of the fixed cutter portion 3. The stationary guard 12 comprises a rearmost three-sided box portion 12a, a guide portion 14, which comprises a conic wall or two walls which slope downwardly and forwardly from the front edge of the box portion 12a and are also sloped with respect to one another and thereby define a central ridge, the two walls being sloped rearwardly away from this central ridge, and a horizontal plate portion 15 which lies close to and over the cutter portions 3 and 5; the blades 3a, and the blades 5a, when in their forwardmost positions are left clear. Between the horizontal plate 15 and movable cutter 5 there is a clearance 17. This clearance is made less than the thickness of the lead 11, or of a finger of a person, by means of a sliding stopper 15a provided on the bottom of the plate 15 which slidably sides on the cutter 5, but does not interrupt the movement of the cutter 5. In integral or fixed attachment to each opposite side of the horizontal plate portion 15 there is a forwardly extending vertical support plate 16 defining a forward end portion which is comparitively long in an upwards direction and lies slightly forward of the front ends of the fixed cutter portion blades 3a. The support plate 16 support a rotary guard 18, comprising a shaft 19 with its opposite ends rotatably mounted by means of light bearings in the upper parts of the forward end portions of the support plates 16 and whose rotational axis is thereby higher than and slightly forward of the front tips of the blades 3a, and a plurality of paddle blades 20, each of which has a length only slightly less than that portion of the shaft 19 lying between the support plates 16 and extends radially outwards with respect to the shaft 19. In this embodiment of the invention, the rotary guard 18 comprises six paddle blades 20, each blade 20 being inclined at 60° to the next two adjacent blades 20. The dimensions of the support arms 16 and the dimensions and position of mounting of the rotary guard 18 are such that when a blade 20 is inclined vertically downwards, as shown in FIG. 2, the outer tip thereof is generally on the same horizontal line as the stationary guard horizontal plate 15, i.e., the tip of the blade 20 is removed from the line of the movable cutter portion blades 5a by a distance equal to that of the clearance 17. Also the rotary guard 18 is so disposed that the space between the tips of the blades 20 thereof and the front edge of the horizontal plate 15 never exceeds a distance generally equal to that of the clearance 17.

Figure 3:
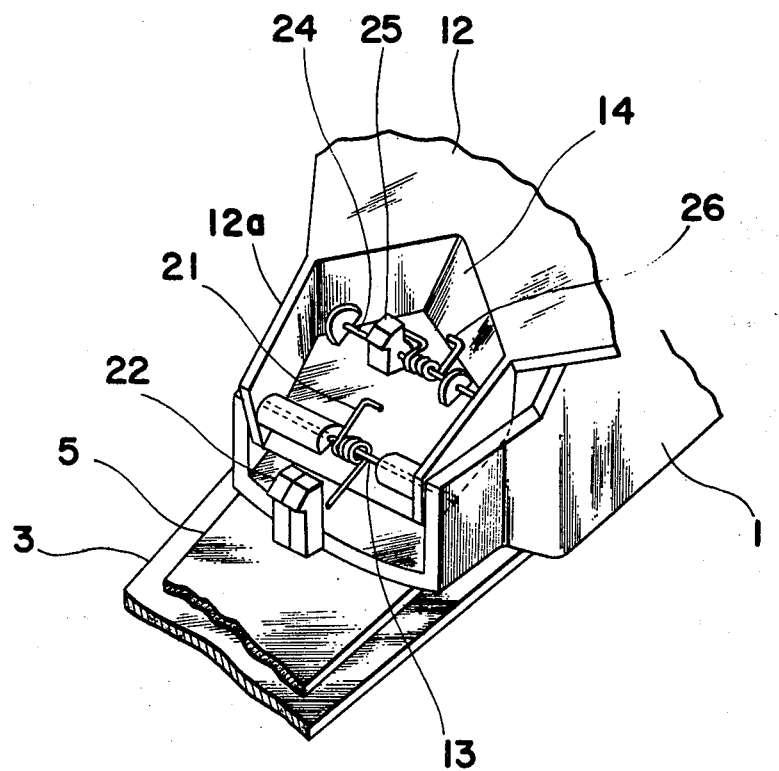
FIG. 3 is a partial perspective view showing a stationary guard of the shears of FIG. 1 in an opened condition.

Referring principally to FIGS. 2 and 3, a shaft 13 which has opposite ends fixedly mounted in the side wall portions of the main body 1 passes freely through openings formed in the side walls of the box portion 12a. The stationary guard 12 and rotatory guard 18 are thus pivotal about the shaft 13. Around a central portion of the fixed shaft 13 a spring 21 in wound which has one end pressed against the upper surface of a front wall extension 1a of the main body 1 and the other end pressed against the lower surface of the top wall of the box portion 12a. This spring exerts a constant force causing the stationary guard 12 to pivot clockwise as seen in FIG. 2.

The guard 12 is retained in its normal position due to engagement of a hook-shaped retainer 22 by a latch 23. The retainer 22 is affixed to and extends upwardly from the main body front wall extension 1a. The latch 23 is in a generally vertical alignment and is pivotally mounted on a fixed shaft 24 having opposite ends mounted in opposite walls of the guide portion 14. The lower end of the latch 23 defines a projection 25 for engagement of the retainer 22, and the upper end thereof passes through an opening formed in the top wall of the box portion 12a and large enough to permit movement of the latch 23, and is contactable externally. A spring 26 wound around the shaft 24 has one end pressed against the upper wall of the box portion 12a and the opposite end pressed against the latch 23, and exerts a constant force to pivot the latch 23 in the direction indicated by the arrow A in FIG. 2, and into engagement with the retainer 22. The latch 23 may be moved out of this engagement by manual pressure applied to the upper end thereof to cause the latch 23 to pivot in the opposite direction, that is, in the direction indicated by the arrow B in FIG. 2. When the latch 23 is thus disengaged from the retainer 22, the spring 21 is unopposed to pivot the guard 12, and hence the rotary guard 18 also, to an open position, as shown in FIG. 3.

Figure 4:
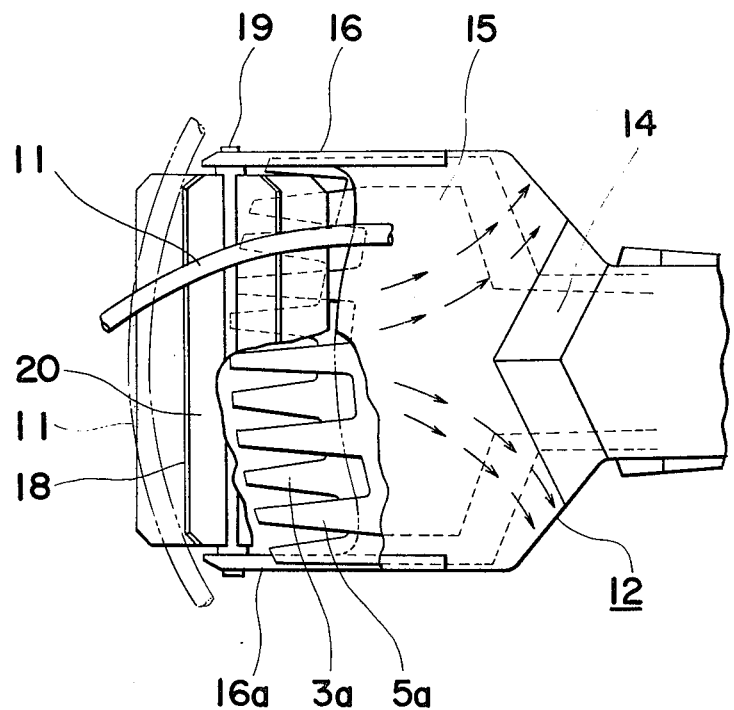
FIGS. 4 and 5 are respectively plane and vertical sectional views illustrating the cutting action of and effects of the guard means in the shears of FIG. 1.
Figure 5:
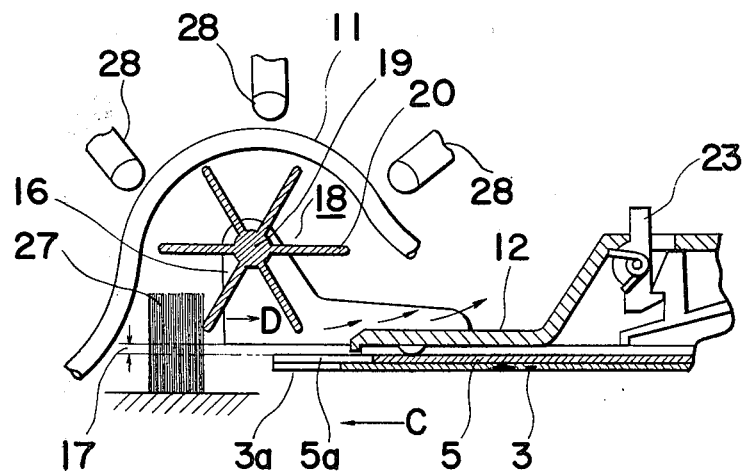

Referring now to FIGS. 4 and 5, when the motor 7 is started and actuates the cutter blades 5a, and the shears are advanced in the direction indicated by the arrow C in FIG. 5, in order to cut grass 27, for example, a paddle blade 20 of the rotary guard 18 is brought into contact with the grass 27 and is pushed in the direction indicated by the arrow D. The rotary guard 18 is rotated counter-clockwise as seen in the drawing so that the next paddle blade 20 is brought into contact with the grass 27 and is pushed in the direction D, thus continuing the rotation of the rotary guard 18 for the other paddle blades 20. When a paddle blade 20 is first brought into contact with the grass 27, the grass 27, while pushing the paddle blade 20, is itself bent down slightly, but before the cutter blades 3a and 5a reach the grass 27, the paddle blade 20 is moved passed a position of vertical alignment, since the rotational axis of the shaft 19 is slightly forward of the front tips of the cutter blades 3a and 5a, and the grass 27 is therefore allowed to spring back to a vertical alignment and come into an optimum position to be cut. As the shears are advanced, the cut-off portions of the grass 27 fall onto the horizontal plate 15 (this movement being aided by the pushing action of next paddle blade 20) and then come against the guide portion 14 and are guided thereby to opposite sides of the shears. During the action of the shears, the rotary guard 18 prevents fingers 28 or the power lead 11, which are to thick to pass through the clearance 17, from coming into contact with the cutter blades 3a and 5a. Even supposing that the power lead 11 lies crosswise relative to the shears and is caught between two paddle blades, as indicated by the chain-dot line portion of FIG. 4, unless the shears are actually forced onto the lead 11, the lead 11 is prevented from coming into contact with the cutting blades 3a and 5a by the support plates 16. After cutting action of the shears, the guards 12 and 18 may be moved clear of the cutter portion in the manner described above, to permit cleaning of the cutter blades, or removal of leaves or twig portions if the shears are used for trimming shrubs or trees, for example, rather than cutting grass.

Although the rotary guard 18 was described above as being rotated due to contact with vegetation being cut, it is equally possible to provide a separate motor and reduction gear for driving the rotatory guard 18, or if the shears are used principally for cutting grass, there may be provided wheel and transmission gear means for driving the rotary guard 18 as the shears are advanced.

Figure 6:
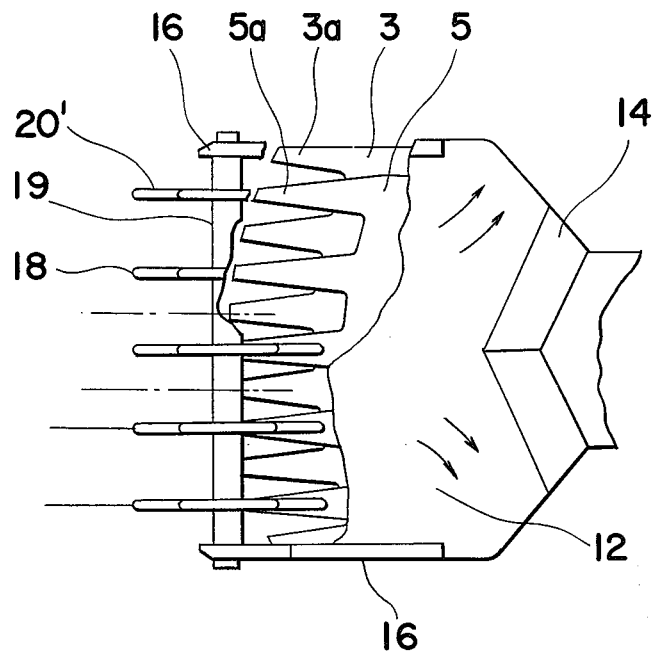
FIGS. 6 and 7 are respectively plane and vertical sectional views showing a second embodiment of the invention.
Figure 7:
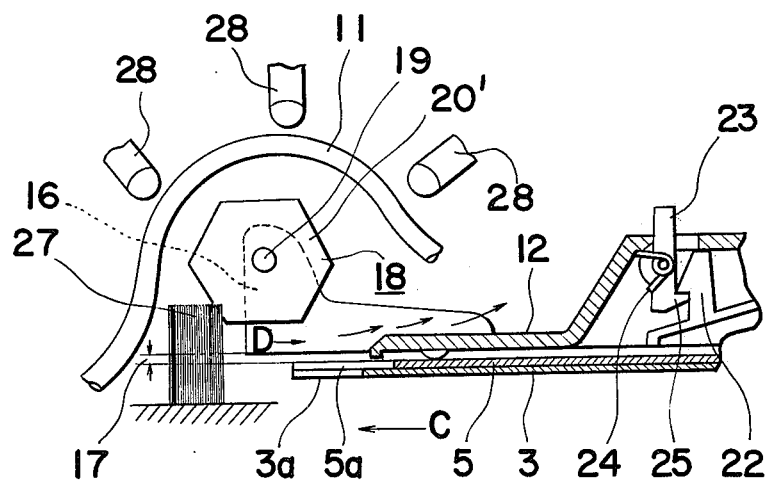

Referring now to FIGS. 6 and 7, there is shown another embodiment of the invention which has the same construction as the first embodiment except that on the rotary guard 18 instead of paddle blades 20 on the shaft 19 there is provided a series of polygonal discs 20', which are centred on and lie at right-angles to the longitudinal axis of the shaft 19. The discs 20' in this embodiment are pentagonal and successive discs 20' are in line with successive pairs of fixed cutter blades 3a. This spacing is normally sufficient to prevent a finger from coming into contact with the cutter blades 3a and 5a. It is of course possible to position the discs 20' at smaller intervals, but if the discs 20' are too close together there may be undue resistance to the advance of the shears. In this embodiment, even if the spacing between the discs 20' is greater than the thickness of the power lead 11, and the power lead 11 comes between two discs 20', contact with the cutter blades 3a and 5a is prevented by the shaft 19. The discs 20' also act to divide the grass 27, for example, into appropriately sized sections for each pair of cutter blades 3a and 5a and thereby permit an extremely fine finish to be imparted to a lawn or other vegetation in a garden.

Although the present invention has been fully described by way of the preferred embodiments thereof with reference to the accompanying drawings, it is to be noted that various changes and modifications are apparent to those skilled in the art. Therefore, unless such changes and modifications depart from the true scope of the present invention, they should be construed as included therein.

What is claimed is:

1. Garden shears for cutting vegetation comprising:
   a main body housing;
   motor means within said housing for driving said shears;
   cutting means attached to said housing and connected to said motor means for cutting vegetation in the path of said shears, said cutting means comprised of:
      a fixed cutter portion attached to the bottom of said housing, said fixed cutter portion having a plurality of cutter blades at the forward end thereof, and
      a movable cutter portion above said fixed cutter portion connected to said motor means and reciprocally movable thereby, said movable cutter portion having a plurality of cutter blades at the forward end thereof; and
   guard means rotatably attached to the front of said housing and extending over said cutting means for preventing unwanted objects from contacting said cutting means, said guard means comprised of:
      a stationary guard rotatably connected to the lower front portion of said body housing, extending forward therefrom and spaced above said cutting means, and
      a rotary guard rotatably mounted to the front of said stationary guard spaced above and parallel to the front of said cutting means.

2. Shears as claimed in claim 1, wherein said rotary guard is slightly in front of said cutting means.

3. Shears as claimed in claim 1, wherein said rotary guard is comprised of:
   a rotatable shaft mounted at the forward end of said stationary guard, and
   a plurality of paddle-like blades on said shaft parallel to the longitudinal axis of said shaft, extending radially outward therefrom and rotatable with said shaft.

4. Shears as claimed in claim 1, wherein said stationary guard is comprised of:
   guide portion means rotatably attached to the front of said housing above said cutting means for guiding vegetation cut by said cutting means to the sides of said housing;
   a horizontal plate member connected to and extending outward in front of said guide portion means above said cutting means; and
   support plate means connected to, extending above and and outward in front of the forward edge of said horizontal plate member for rotatably supporting said rotary guard.

5. Shears as claimed in claim 1, further comprising:
   shaft means through said stationary guard and the lower front portion of said housing for rotatably mounting said guard means to said housing;
   first spring means wound around said shaft means and forced against said stationary guard for urging said rotatable guard means away from said cutting means;
   a retainer connected to and extending above the lower front edge of said housing in front of said shaft means; and
   externally actuatable latch means fitted to and through said stationary guard for engaging said retainer and holding said guard means against said retainer and overcoming the force of said first spring means forcing said guard means away from said cutting means.

6. Shears as claimed in claim 5, wherein said latch means is comprised of:
   a shaft fixed to the underside of said stationary guard above said retainer;
   a latch pivotally mounted on said shaft extending through said stationary guard and projecting thereabove at one end, and engaging said retainer at the other end; and
   second spring means wound around said shaft forced against the underside of said stationary guard at one end and against said latch at the other end for urging said pivotable latch against said retainer.

7. Shears as claimed in claim 1 further comprisng an electrical lead for connecting said motor means to a power source, and wherein said stationary guard is spaced above said cutting means less than the distance equal to the thickness of said electrical lead.

8. Shears as claimed in claim 1 wherein said rotary guard is comprised of:
   a rotatable shaft mounted at the forward end of said stationary guard; and
   a plurality of discs mounted concentrically on said rotatable shaft for rotation therewith and spaced from each other at right angles to said shaft.

9. Shears as claimed in claim 8 wherein said discs are in the shape of polygons.

10. Shears as claimed in claim 8 wherein said discs are disposed along said rotatable shaft corresponding to the intervals between said cutter blades at the forward end of said fixed cutter portion.

* * * * *